Jan. 22, 1929.
W. MURRAY
1,699,906
ELECTRIC FLASH LIGHT PHOTOGRAPHIC CAMERA
Filed Jan. 11, 1928    2 Sheets-Sheet 1
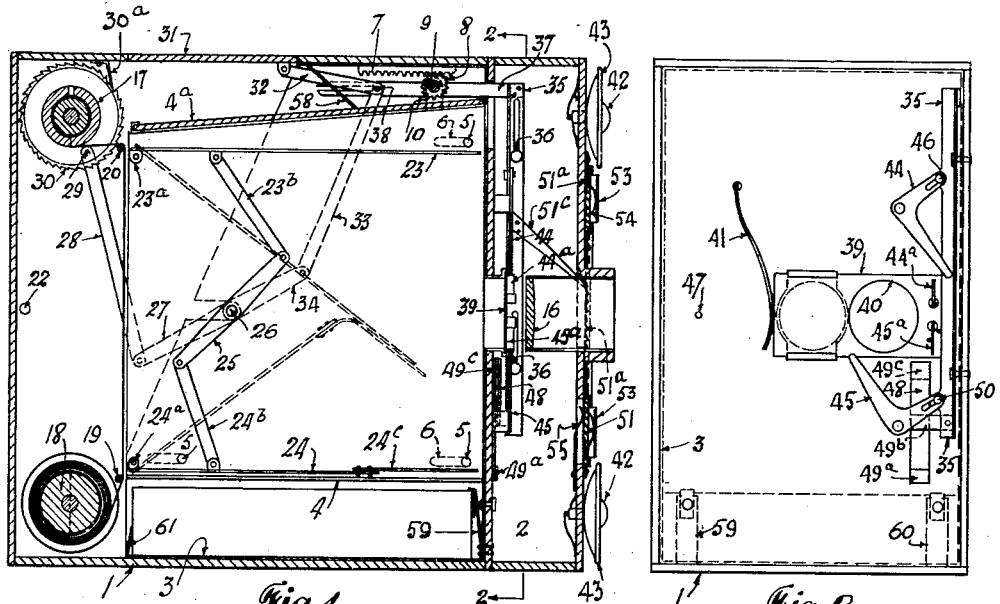
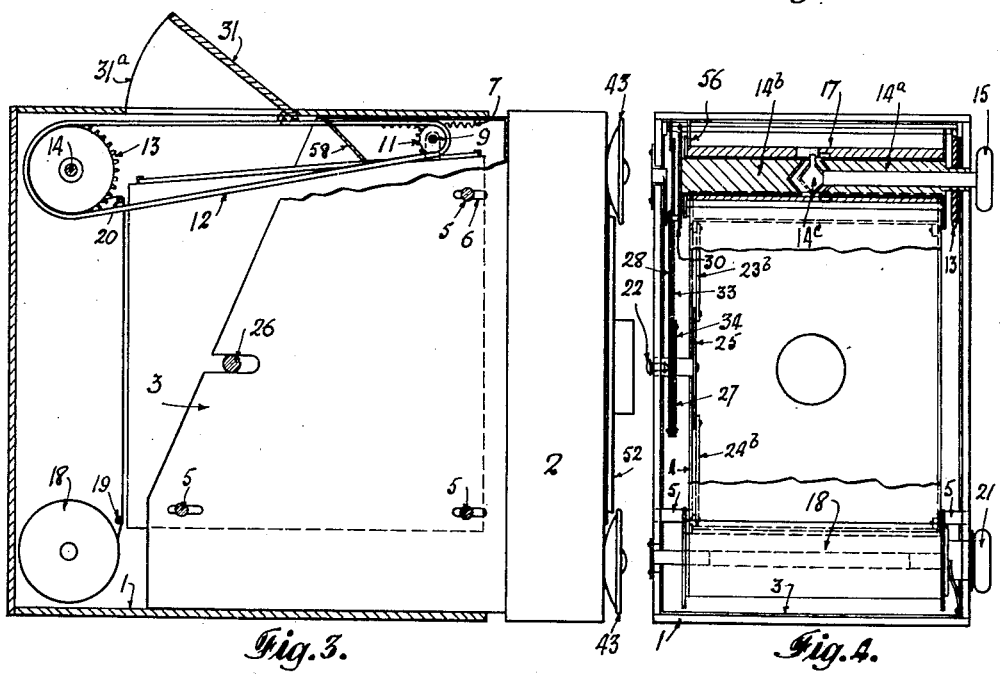
Inventor:
William Murray.
By his Attorney: Walter Gunn.

Jan. 22, 1929. 1,699,906
W. MURRAY
ELECTRIC FLASH LIGHT PHOTOGRAPHIC CAMERA
Filed Jan. 11, 1928   2 Sheets-Sheet 2

Inventor:
William Murray.
By his Attorney: Walter Gunn.

Patented Jan. 22, 1929.

1,699,906

UNITED STATES PATENT OFFICE.

WILLIAM MURRAY, OF ASHTON-UNDER-LYNE, ENGLAND.

ELECTRIC FLASH-LIGHT PHOTOGRAPHIC CAMERA.

Application filed January 11, 1928, Serial No. 246,058, and in Great Britain January 13, 1927.

This invention relates to photographic cameras, and has for its object to provide a camera which may be used without change for either diurnal or nocturnal photography, and wherein the several operations of focussing through the lens, lighting up focussing lights, advancing the film, opening and closing the shutter, and igniting a magnesium flash cartridge, are effected by means of a single control knob or wheel or the like.

The invention will be described with reference to the accompanying drawings, wherein Fig. 1 is a sectional elevation of the improved camera with its parts in the normal (pre-exposure) position.

Fig. 2 is a transverse section on the line 2—2 of Fig. 1.

Fig. 3 is a further and part sectional elevation of the camera in an operative position.

Fig. 4 is a part sectional rear view with the rear cover removed.

Figure 6:
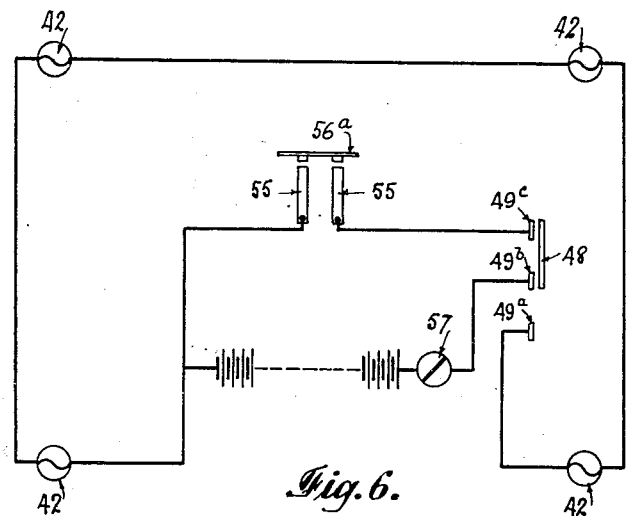

Fig. 6 a diagram of the wiring, and

Figure 5:
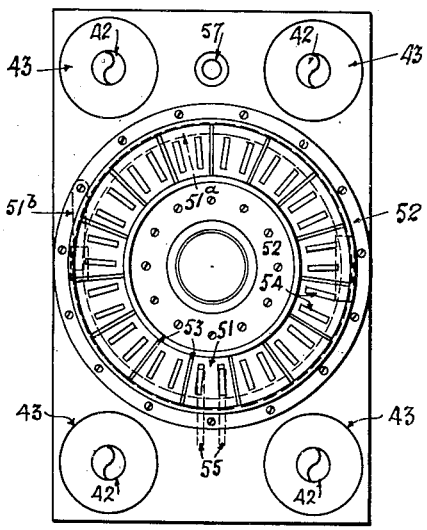
Fig. 5 is a front view.
Figure 8:
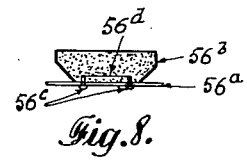
Figure 9:
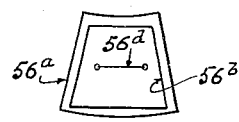
Figure 7:

Figs. 7, 8, and 9 details hereinafter described.

Referring to the drawings, the improved camera comprises a body part or outer casing 1 consisting of four sides and an end the other end being open, and a further closed box or chamber 2 of equivalent cross section to the outer cover 1 and lying normally adjacent the open end of the outer cover 1. Such closed box 2 is secured to a sheet metal open ended tube or box frame 3, which extends into the outer box 1 and slidably fits the same so that the closed chamber 2 may be moved towards and away from the outer cover 1 by sliding the box 3 in and out of the cover 1. Within the box 3 is a further box 4 open at each end, and supported from the outer cover 1 by means of the short stays 5 passing through the slots 6 in the sheet metal box 3.

Secured to the sheet metal box 3 on its inner side is a toothed rack 7 with which meshes a pinion 8 on a spindle 9 carried in bearings 10 projecting from the inner box 4. Also upon the spindle 9 is a sprocket wheel 11 connected by means of the chain 12 to a further and larger sprocket wheel 13 loosely mounted on a spindle 14, this latter projecting through the side of the camera and being fitted with the operating knob 15. It will be seen that on rotating the sprocket wheel 13, in a manner hereinafter explained, the spindle 9 and the pinion 8 are rotated and the parts 2 and 3 caused to move away from or towards the part 1 as desired, and as the part 2 carries the lens 16 and the part 1 carries the film this movement is useful in adjusting the focus of the camera. This will be set forth in further detail later.

17 and 18 are the film spools or reels, the spool 17 being non-removable, and the spool 18 being removable for the insertion of fresh films. The film passes from the spool 18 over the guide 19 across the open end of the inner box 4, over the guide 20 and on to the spool 17, the film being rewound on to the spool 18 when all sections of it have been exposed, so that it may be removed and a fresh spool inserted. The spool 18 is mounted in the known manner, and for the purpose of the rewinding a push-pull knob 21 of the usual type is provided. The end of the outer cover 1 is hinged or removable and is secured in the closed position by the spring catch 22.

Within the inner box 4 are two baffles 23 and 24, pivoted respectively at 23ª and 24ª and connected by means of links 23ᵇ and 24ᵇ to the respective ends of a pivoted lever 25 carried on a stud 26 passing through the side of the box 4. On that part of the stud 26 between the boxes 3 and 4 is a lever arm 27 connected to one end of a connecting rod 28 the other end of which is connected to a crank pin 29 on a disc 30 co-axial with the spindle 14 of the operating knob 15. The edge of the disc 30 is formed with ratchet teeth, and a pawl 30ª engaging therewith prevents backward movement of the disc.

In the top of the outer cover 1 is a hinged door 31, provided with collapsible side wings 31ª, and to such door is attached a lever arm 32 connected by means of the link 33 to the lever arm 34 on the stud 26. The top face of the inner box 4 consists of a sheet of frosted glass 4ª, and the upper face of the baffle 23 is silvered or otherwise treated to form a reflector.

It will now be seen that on rotating the disc 30 as hereinafter explained, the crank pin 29 through the connecting rod 28 and lever arm 27 rotates the pivoted lever 25 in the direction of the arrow (Fig. 1) and with the crank pin in its highest position brings the two baffles 23 and 24 together as shown by dotted lines in Fig. 1 so that with the shutter open the film is completely shielded from the light. The baffle 24 is provided on its free edge with a flexible member 24ᶜ which ensures a light proof joint between the two baffles. At the same time the door 31, by means of the parts 32, 33, and 34 has been raised so that, with the shutter open, the operator on looking into the camera through the open door 31, sees the image reflected by the baffle 23 on to the frosted glass $4^a$.

The means for operating the shutter and associated parts is as follows: In the chamber 2 is a vertical rod or bar 35, slidable on guides 36 and having at its top end an extension 37 extending back into the camera proper. Such extension is slotted and engages a pin 38 on the lever arm 32 in such a manner that the extension 37 may move longitudinally with the box 2 without affecting the lever arm, but on the opening and closing of the door 31, the lever arm 32 causes the rod 35 to fall and rise.

The shutter comprises a sliding plate 39 having an aperture 40, and normally closed under the influence of a spring 41.

Also in the chamber 2 are four small electric bulbs 42, with reflectors 43, wired in series and in the current of a 30 volt battery carried in the box 3 beneath the inner box 4, and two bell crank levers 44 and 45, adapted to open the shutter at predetermined times. Upon the rod 35 is a pin or stop 45 which as the rod moves downwards engages one arm of the bell-crank lever 44, the other arm of which abuts against the spring stop $44^a$ and moves the shutter to the open position.

As the rod continues its downward movement, the shutter meets the stop 47, the lever 44 is forced beyond the spring stop $44^a$, and the shutter flies back to its normal position. Also during this downward movement, a contact piece 48 on the rod 35 bridges the fixed contacts $49^a$ and $49^b$ on the camera, to complete the battery circuit and light up the bulbs 42.

Upon the upward movement of the rod 35 a further pin or stop 50 on the lower end of the rod engages one arm of the bell crank lever 45, the other arm of which abuts against the spring stop $45^a$ and moves the shutter to the open position. At the same time the contact piece 48 bridges the fixed contacts $49^b$ and $49^c$ to complete the battery circuit to an electrically ignited magnesium cartridge, the lever 45 when the shutter meets the stop 47, being forced past the spring stop $45^a$ and thus allowing the shutter to close instantly. As the bell crank levers return to their normal positions the spring stops offer no resistance but yield under the pressure of the levers.

Upon the outside of the camera, at the front, is an annular plate or ring 51, rotatably mounted in circular guides 52. This plate or ring is divided into a number of sections, each section comprising two grooved guides 53, and two bow-spring contacts 54, the contacts of the lowermost section bearing against the fixed contacts 55 on the camera, in the battery circuit. In each section is placed a magnesium cartridge, a cartridge consisting of a flange $56^a$ to fit the guides 53 the paper or card container $56^b$ in which is the magnesium powder, and two contacts $56^c$ extending through the flange, and having within the container a fuse wire $56^d$. When the cartridge is in position, the contacts $56^c$, and 54 meet so that on the completion of the circuit by the bridging of the contacts $49^b$ and $49^c$ the fusing of the wire $56^d$ ignites the magnesium powder and produces the desired flash.

On the back of the annular plate or ring 51 are teeth or notches $51^a$ some of which lie in the path of a projection 57 on the rod 35 and extending through a slot in the front of the camera, the downward movement of the rod causing the annular plate to be rotated in its guides to bring the next cartridge into position relative to the fixed contacts 55. A pawl $51^b$ serves to hold the plate 51 whilst the rod 35 and projection 57 are returned to their uppermost position.

In Fig. 4, the means for operating the various elements of the camera by means of a single knob are illustrated. The sprocket wheel 13 and the disc 30 are secured respectively to two bushes $14^a$ and $14^b$ housed within the film spool 17, and formed on their inner ends with dogs or clutch teeth. The inner end of the spindle 14 is provided with a clutch member $14^c$ also having dogs or clutch teeth, this clutch member being moved into engagement with the bushes $14^a$ or $14^b$ at will, or remaining in a neutral position. When in contact with the bush $14^b$ the clutch member also engages the film spool 17. To give rigidity the end of the spool 17 furthest from the operating knob 15 is supported by a bracket 56. If desired the usual "view finders" may be provided in two of the front corners of the camera.

The manner of operating the camera is as follows:—

The camera, having the shutter closed, the baffles 23 and 24 in their horizontal positions, the crank pin 29 in its lowermost position, the boxes 1 and 2 abutting and an already exposed section of the film, or a non-sensitized section of the film across the end of the box 4, is brought within reasonable focussing distance of the object to be photographed. The knob 15 is then pushed inwards until the clutch member $14^c$ engages the bush $14^b$, whereby, on rotating the knob 15 in a clockwise direction for almost a half turn, the baffles 23 and 24 are brought together to shield the film, the door 31 is opened, the shutter 39 is opened, the focussing lights 42 are lit up, the cartridge carrier 51 is advanced one section and the film is advanced a half-section. The object to be photographed may now be viewed on the frosted glass $4^a$.

To adjust the focus of the lens, the knob 15 is pulled outwards until the clutch member 14ᶜ engages the bush 14ᵃ, whereupon the parts 1 and 2, and consequently the film and lens, may be adjusted relatively to each other by rotating the knob. When the focus has been corrected, the knob is again pushed inwards to rotate the bush 14ᵇ and its associated parts, whereby on the bush being rotated the remainder of a complete turn, the shutter is closed, the baffles are returned to their horizontal position, the door 31 is closed, the lights 42 are extinguished, the film is advanced another half section, the shutter is again opened, the magnesium cartridge is ignited and the shutter is closed a second time.

To allow of the parts 1 and 2 being brought together again the knob 15 is brought to a neutral position where the clutch member is free from the bushes and the film spool. In this position of the knob also, the film may be re-wound on to the lower spool 18.

If the camera is to be used for diurnal photography, the lights 42 and magnesium cartridge will of course not be required, and they may be disconnected from the battery by means of the switch 51ᶜ.

To localize the light through the door 31, a partition 58 is provided in the box 3.

To hold the pole pieces of the battery against the terminals 59 and 60, a spring 61 is provided, the battery moving along with the boxes 2 and 3. A handle may be fitted to the camera if desired, and also screwed sockets to receive a tripod or the like.

Instead of advancing the film in two stages, it may be advanced a whole section at once, this being effected by disconnecting the clutch 14ᶜ from the spool 17 when it engages the bush 14ᵇ.

The usual light regulator, or iris diaphragm may be fitted if desired, and although the camera has been described as adapted for roll films, it may equally well be adapted for a film pack, or for plates.

What I claim is:—

1. A photographic camera for diurnal or nocturnal use, comprising in combination means for focussing the camera, focussing lights, means for lighting up said focussing lights, means for advancing a film, a shutter, means for opening and closing said shutter, means for igniting a magnesium flash cartridge and a single control member adapted to operate selectively any of said means, as set forth.

2. A photographic camera for diurnal or nocturnal use, comprising in combination an outer cover with open end, upper and lower film spools within said outer cover adapted to carry a sensitized film, means in said outer cover for advancing a film, a closed chamber adjacent the open end of said cover, a lens in said closed chamber, means for drawing the outer cover and closed chamber towards or away from each other to alter the focus of the camera, a shutter in said closed chamber behind the lens, means for opening and closing said shutter, focussing lights, means for lighting up said focussing lights, means for igniting a magnesium flash cartridge and a single control member adapted to operate selectively any of said means, as set forth.

3. A photographic camera for diurnal or nocturnal use, according to claim 2, and having an inner open ended box within the outer cover, one end of such inner box being adjacent the space between the film spools, a frosted glass panel in the top of said inner box, hinged baffles in said inner box, a lever pivoted on a stud in said inner box and connected by links to said baffles and adapted when rotated to bring the baffles together to shield the film from light passing through the lens, an observation door in the top of the outer cover with collapsible side wings, means connecting said door to a lever on said stud so that on the baffles being brought together the door is opened, and a single control member adapted in one position to draw the baffles together, to open the observation door and to open the shutter.

4. A photographic camera for diurnal or nocturnal use, comprising in combination an outer cover with open end, upper and lower film spools therein adapted to carry a sensitized film, an inner open ended box within the outer cover, one end of such inner box being adjacent the space between the film spools, a frosted glass panel in the top of said inner box, hinged baffles in said inner box, a lever pivoted on a stud in said inner box and connected by links to said baffles and adapted when rotated to bring the baffles together to shield the film from light passing through the lens, an observation door in the top of the outer cover with collapsible side wings, means connecting said door to a lever on said stud so that on the baffles being brought together the door is opened, bushes housed within the upper film spool, a sprocket wheel connected to one of said bushes, a spindle, bearings on the inner box for said spindle, a further sprocket wheel on said spindle and a chain passing over the two sprocket wheels, a pinion on said spindle, a rack connected with the closed chamber and meshing with said pinion, a disc connected to the other of said bushes, a crank pin in said disc and a connecting rod connecting said crank pin with a lever on the stud in the inner box, ratchet teeth in the edge of the disc and a pawl to prevent backward movement of the disc, clutch teeth on the inner ends of said bushes, a clutch member between said inner ends, a spindle connected to said clutch member and passing through one of said bushes to a point outside the camera and an operating knob on the end of said spindle whereby the clutch member is adapted in one position to operate the baffles and observation door, in another position to move the outer cover and closed chamber towards and away from each other, and in a further position to rotate the upper film spool, as set forth.

5. A photographic camera for diurnal or nocturnal use according to claim 4, and having a vertical rod in the closed chamber connected with a lever on the observation door, guides for said rod, stops on said rod, a shutter in said closed chamber, guides for said shutter, spring stops on said shutter, bell crank levers in said closed chamber engaging the stops on said rod and the spring stops on the shutter and a spring to hold the shutter normally closed, as set forth.

6. A photographic camera for diurnal or nocturnal use according to claim 4, and having a vertical rod in the closed chamber and connected with a lever on the observation door, guides for said rod, stops on said rod, a shutter in said closed chamber, guides for said shutter, spring stops on said shutter, bell crank levers in said closed chamber engaging the stops on said rod and the spring stops on the shutter, a spring to hold the shutter normally closed, electric focussing lights on the front of the closed chamber, fixed contacts in circuit therewith, a battery also in circuit therewith and a further contact on the vertical rod adapted when in one position to bridge the fixed contacts and illuminate the lights, as set forth.

7. A photographic camera for diurnal or nocturnal use according to claim 4, and having a vertical rod in the closed chamber and connected with the lever on the observation door, guides for said rod, stops on said rod, a shutter in said closed chamber, guides for said shutter, spring stops on said shutter, bell crank levers in said closed chamber engaging the stops on said rod and the spring stops on the shutter, a spring to hold the shutter normally closed, electric focussing lights on the front of the closed chamber, fixed contacts in circuit therewith, a battery also in circuit therewith and a further contact on the vertical rod adapted when in one position to bridge the fixed contacts and illuminate the lights, an annular plate or carrier on the front of the camera divided into sections, to hold magnesium flash cartridges, spring contacts and guides in each of said sections, fixed contacts in the closed chamber bearing against the spring contacts of one section, ratchet teeth on said annular plate, a feed pawl on the vertical rod to advance the annular plate, a pawl to prevent backward movement of the plate, a further fixed contact in the closed chamber in the path of the contact on the vertical rod, whereby the last named contact in one position completes the circuit to the magnesium cartridge, and a switch in the battery circuit, as set forth.

8. A photographic camera for diurnal or nocturnal use comprising in combination an outer box open at one end, with hinged cover at the other end and with an observation door with collapsible side wings in its top; a sheet metal box telescoping within said outer box; a closed chamber secured to said sheet metal box; upper and lower film spools in the outer box, one of said spools being removable; means for winding a film from the non-removable spool to the removable spool; an inner box secured to the outer box; a frosted glass panel in the top of said inner box; guides to guide a film passing from one spool to the other across the end of the inner box; a lens tube in the closed chamber; a lens in said lens tube; hinged baffles in the inner box one side of one baffle serving as a reflector; means to bring the baffles together to shield a film from the lens; a shutter within the closed chamber; an electric battery; fixed contacts in the closed chamber; electric focussing lights; a magnesium cartridge holder; teeth on said holder; a vertical rod in the closed chamber; guides for said rod; a feed pawl on said rod to engage the teeth on the cartridge holder; an electric contact on said rod to engage the fixed contacts; means on said rod for opening the shutter on the downward movement of the rod; and further means on said rod for opening the shutter on the upward movement of the rod; an arm on said rod connected with the means for bringing the baffles together; an arm on the observation door connected with the means for bringing the baffles together; a crank and connecting rod on the axis of the non-removable spool connected with the means for bringing the baffles together; a rack on the sheet metal box; a pinion meshing therewith; means on the axis of the non-removable spool for rotating said pinion; an operating knob; a clutch member connected with the operating knob adapted to be connected with either the crank, the non-removable spool or the means for rotating the pinion; and a switch in the battery circuit as set forth.

In testimony whereof I have signed my name to this specification.

WILLIAM MURRAY.